March 22, 1966  D. C. JONES  3,241,244
APPARATUS FOR MEASURING AND ADJUSTING THE SETTING
OF A SELF-CENTERING BRAKE ASSEMBLY
Filed Dec. 23, 1963  5 Sheets-Sheet 1

INVENTOR.
DAVID C. JONES
BY
*Gordon H. Chenez*
AGENT

March 22, 1966 D. C. JONES 3,241,244
APPARATUS FOR MEASURING AND ADJUSTING THE SETTING
OF A SELF-CENTERING BRAKE ASSEMBLY
Filed Dec. 23, 1963 5 Sheets-Sheet 2

INVENTOR.
DAVID C. JONES
BY
AGENT

March 22, 1966  D. C. JONES  3,241,244
APPARATUS FOR MEASURING AND ADJUSTING THE SETTING
OF A SELF-CENTERING BRAKE ASSEMBLY
Filed Dec. 23, 1963  5 Sheets-Sheet 3

INVENTOR.
DAVID C. JONES
BY
AGENT

INVENTOR.
DAVID C. JONES
BY

AGENT

March 22, 1966 D. C. JONES 3,241,244
APPARATUS FOR MEASURING AND ADJUSTING THE SETTING
OF A SELF-CENTERING BRAKE ASSEMBLY
Filed Dec. 23, 1963 5 Sheets-Sheet 5

INVENTOR.
DAVID C. JONES
BY
Gordon H Chenez
AGENT

United States Patent Office 3,241,244
Patented Mar. 22, 1966

3,241,244
APPARATUS FOR MEASURING AND ADJUSTING THE SETTING OF A SELF-CENTERING BRAKE ASSEMBLY
David C. Jones, South Bend, Ind., assignor to The Bendix Corporation, South Bend, Ind., a corporation of Delaware
Filed Dec. 23, 1963, Ser. No. 332,620
6 Claims. (Cl. 33—180)

This invention relates, in general, to brake assembly adjusting apparatus and, in particular, to a fixture for determining the effective diameter between friction surfaces of a self-centering brake assembly and for adjusting the brake shoes thereof to establish a predetermined effective diameter.

In the past, various adjusting fixtures have been utilized to establish a predetermined setting of self-centering brake assemblies subsequent to assembly thereof. By "self-centering brake assembly" applicant means a brake assembly similar to that shown and described in Patent No. 2,885,032 issued May 5, 1959, to E. K. Dombeck and entitled, "Self-Centering Brake Assembly." The adjusting fixtures in use to date have not been entirely satisfactory in that accuracy of adjustment of the brake shoes has been dependent upon moving one shoe to a fixed locating point and determining the location of the opposite shoe which arrangement results in distortion of the brake shoes from their free position and subsequent inconsistent accuracy of adjustment. It will be recognized that consistent accurate setting of all brake assemblies throughout a given production run is desirable since any significant deviation from the abovementioned predetermined setting results in rejection of the corresponding brake assembly followed by suitable steps to correct the objectionable brake assembly. The additional steps required to correct the brake assembly setting result in additional labor expense as well as lower production rates of suitable brake assemblies which, in a high volume product such as automobile brake assemblies, cannot be tolerated.

It is therefore an object of the present invention to provide brake assembly adjusting apparatus for rapidly and accurately adjusting the brake shoes of a brake assembly to a predetermined setting.

It is another object of the present invention to provide simple and effective apparatus for rapidly and accurately determining the effective diameter of a self-centering brake assembly and for adjusting the brake shoes thereof to correct said diameter to a predetermined value.

It is an important object of the present invention to provide apparatus for determining the relative positions of the brake shoes of a self-centering brake assembly without distorting the brake assembly from its free position and for adjusting the brake shoes thereof to establish a predetermined brake assembly setting.

Other objects and advantages of the present invention will be apparent from the following description taken in conjunction with the accompanying drawings wherein.

Figure 1:
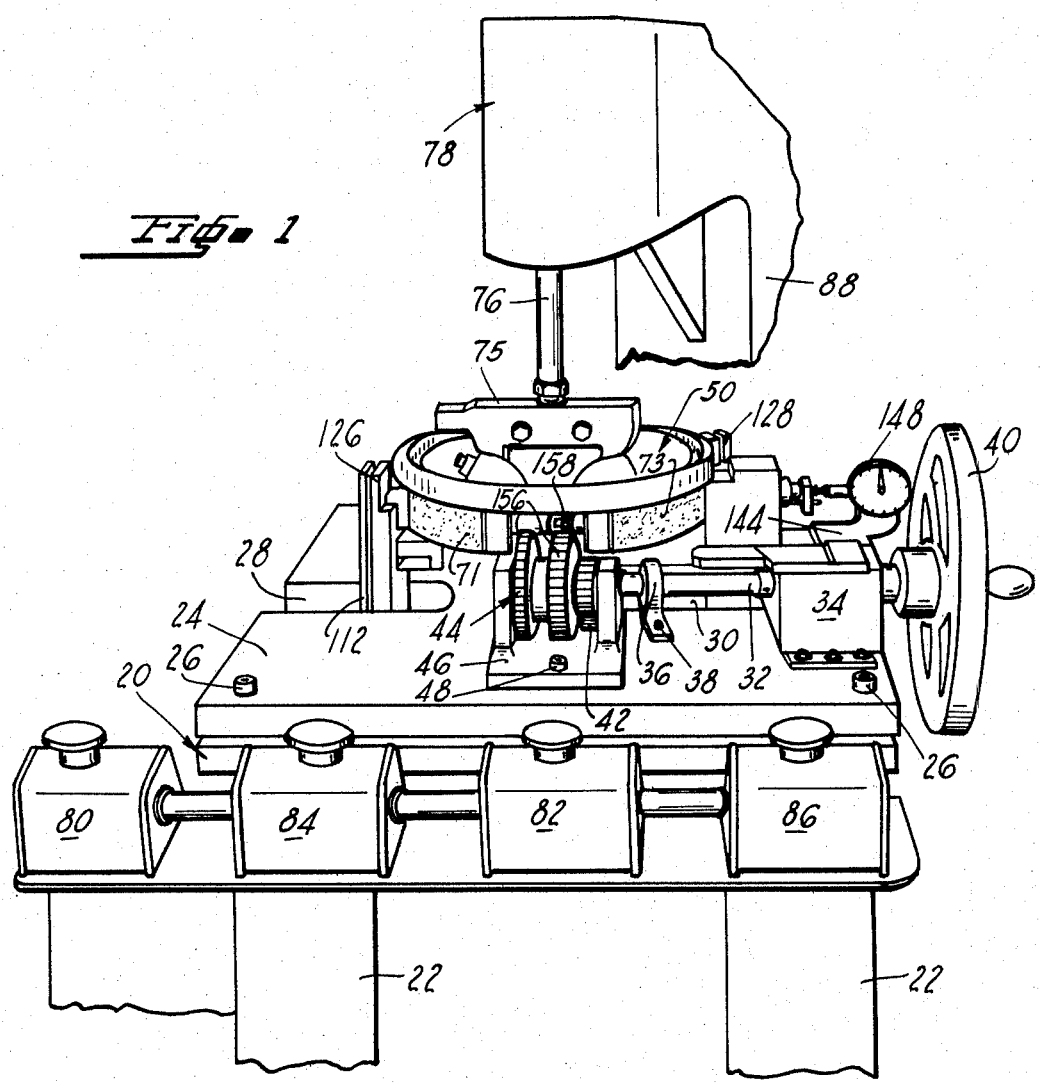
FIGURE 1 illustrates apparatus embodying the present invention with a self-centering brake assembly operatively positioned therein.
Figure 2:
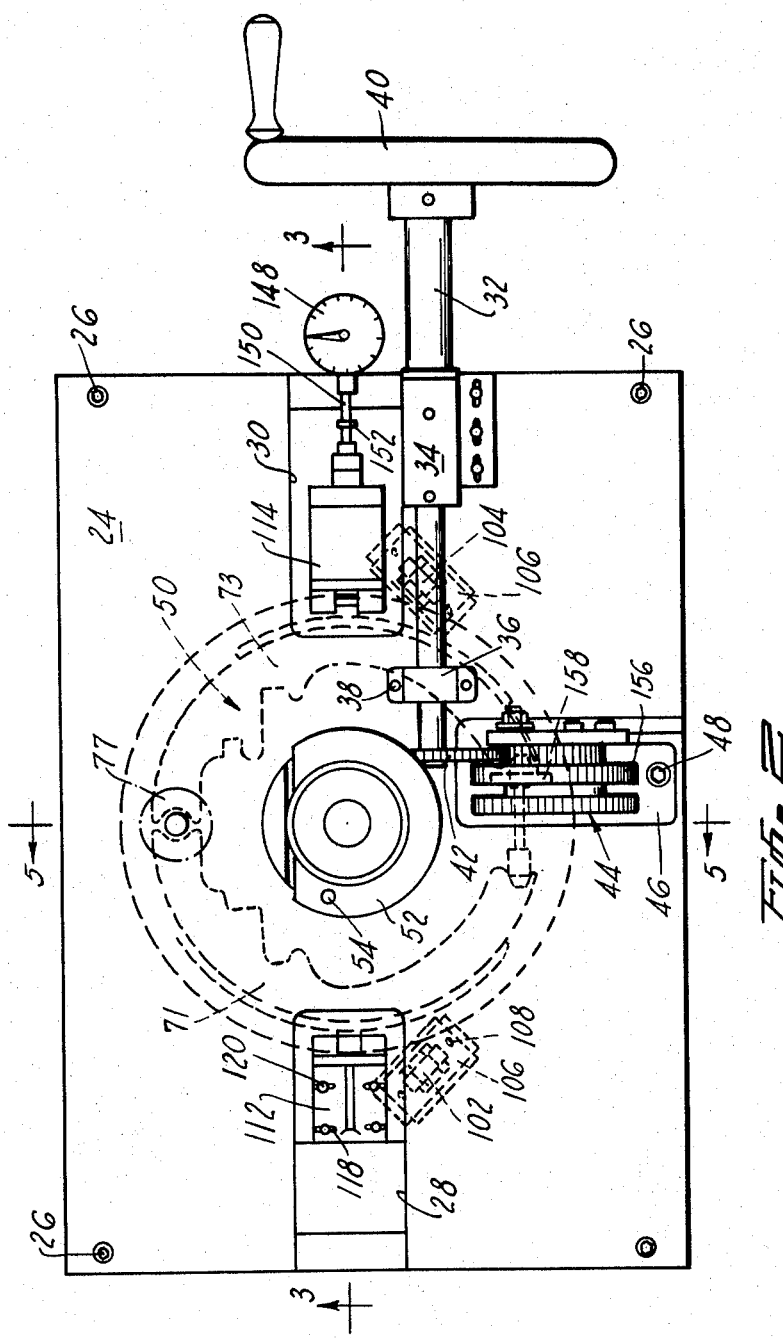
FIGURE 2 is a plan view of the apparatus of FIGURE 1 with the upper ram portion removed disclosing the lower base portion with the brake adjusting fixture exposed and the brake assembly shown in dashed lines in position in the fixture.

Referring to the drawings, numeral 20 designates a support platform having legs 22 fixedly secured thereto. A plate 24 removably secured to platform 20 by suitable fastening means such as bolts 26 is provided with oppositely disposed elongated slots 28 and 30 only one of which can be seen fully in FIGURE 1. The opposite slot 30 is partially obscured by a shaft 32 journaled in supports 34 and 36 which are suitably secured to plate 24 as by bolts 38. One end of shaft 32 is provided with a hand operated wheel 40 suitably secured thereto. A gear 42 fixedly secured to the opposite end of shaft 32 is rotatable therewith in response to movement of wheel 40 and is adapted to adjust the setting of the brake assembly as will be described. The gear 42 drives a gear train generally indicated by 44 which gears are mounted on associated shafts suitably journaled in a support member 46. Support member 46 is removably secured to plate 24 by a plurality of fastening members such as bolt 48.

A brake assembly 50 of the self-centering type is shown in position upon a support having a head portion 52 provided with a locating pin 54 and a spindle portion 56 which extends through a bushing 58 fixedly secured in an opening 60 in plate 24 by any suitable means such as a weld and which is provided with a reduced diameter threaded portion 62. The threaded portion 62 extends through an opening 64 in a plate 66 an is engaged by a nut 68 which secures the spindle portion 56 to the plate 66. The plate 66 is fixedly secured to legs 22 by any suitable means such as welding as shown.

Figure 6:
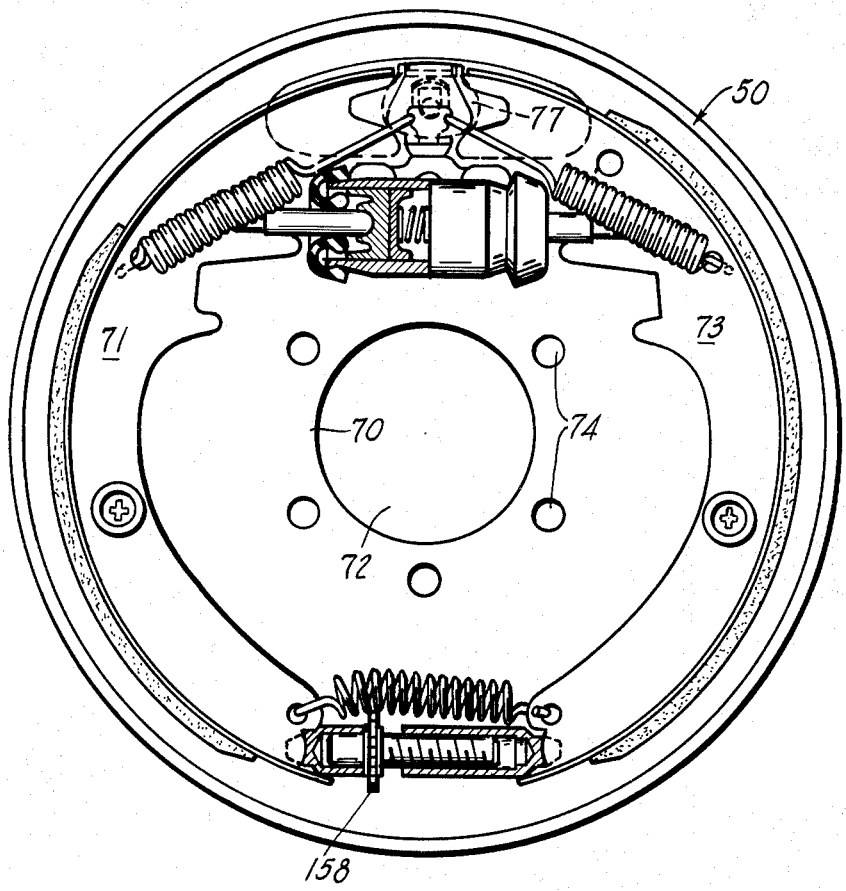
FIGURE 6 is a plan view of the self-centering type brake assembly shown in FIGURE 1.

Referring to FIGURE 6 the backing plate 70 of the brake assembly 50 is provided with the usual openings 72 and 74 for attachment to a stub axle, not shown, of a vehicle to which the plate 70 is mounted. Brake shoes 71 and 73 have adjacent ends which bear against an anchor member 77 fixedly secured to backing plate 70. The brake shoes 71 and 73 with associated connecting members are adapted to pivot as a unit about the axis of the anchor member 77. The head portion 52 is contoured to fit the opening 72 and the locating pin 54 attached to head portion 52 is adapted to extend through one of the openings 74 in the backing plate 70 with the brake assembly 50 positioned as shown in FIGURE 1. The brake assembly 50 is clamped in position against head portion 52 by a vertically movable ram member 75 secured to a shaft 76 which is actuated by suitable motor means generally indicated by 78. Preferably, the motor means is of the hydraulic or pneumatic pressure actuated type and the actuating fluid thereto is controlled by a pair of control members 80 and 82 which require the use of both hands of the operator as a safety feature to effect energization of the motor means 78 upward as will be readily understood by those persons skilled in the art. Likewise, control members 84 and 86 require the use of both hands of the operator to effect downward movement of the motor means 78. The motor means is secured to a support column 88 which, in turn, is fixedly secured to support platform 20 by any suitable means, not shown.

Figure 3:
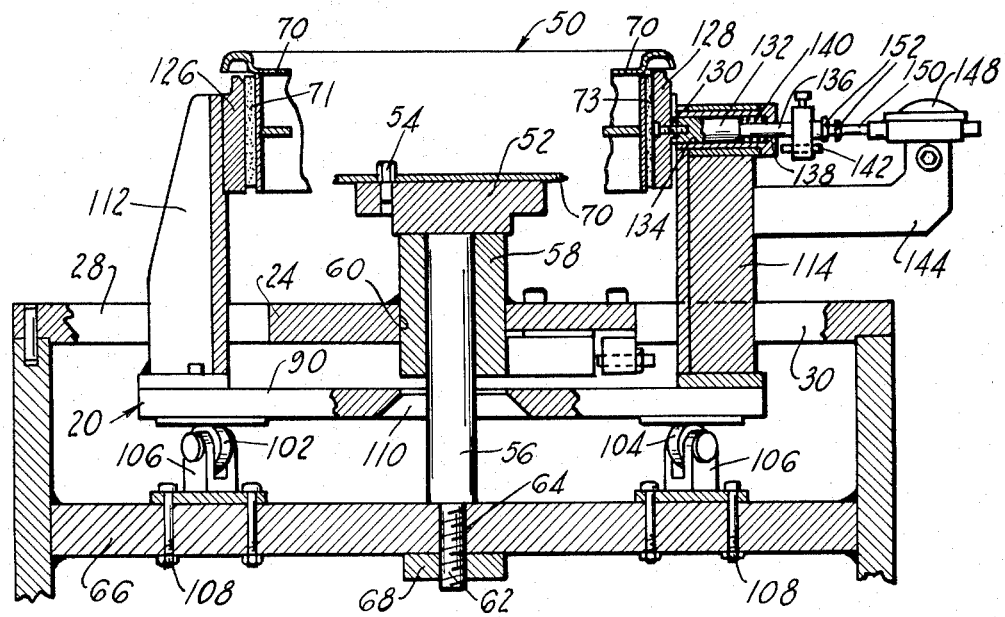
FIGURE 3 is a cross sectional view taken on line 3—3 of FIGURE 2.
Figure 4:
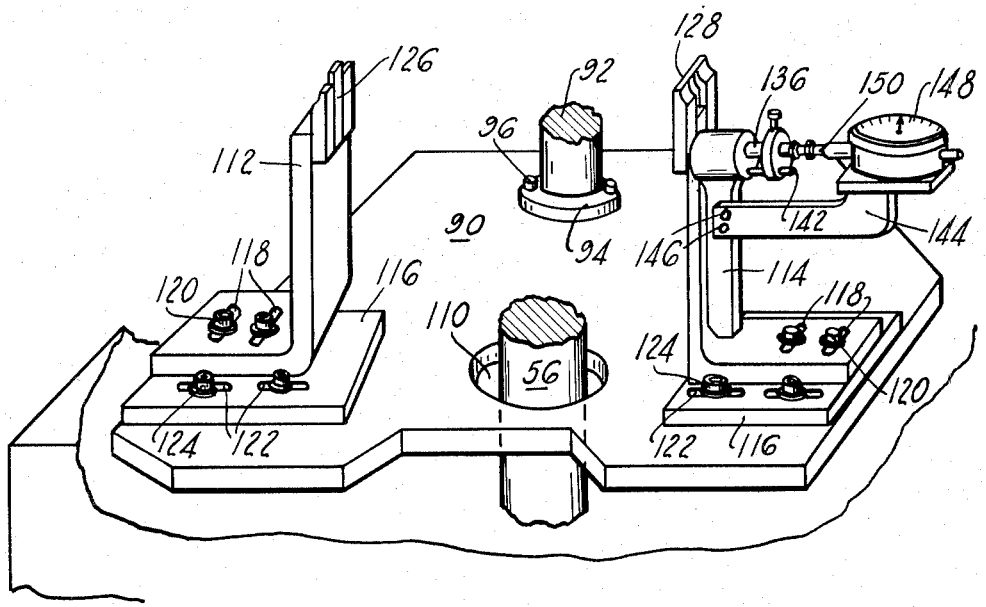
FIGURE 4 is an oblique view of a portion of FIGURE 3 showing a movable portion of the brake adjusting fixture upon which the brake shoe contacting members are mounted.
Figure 5:
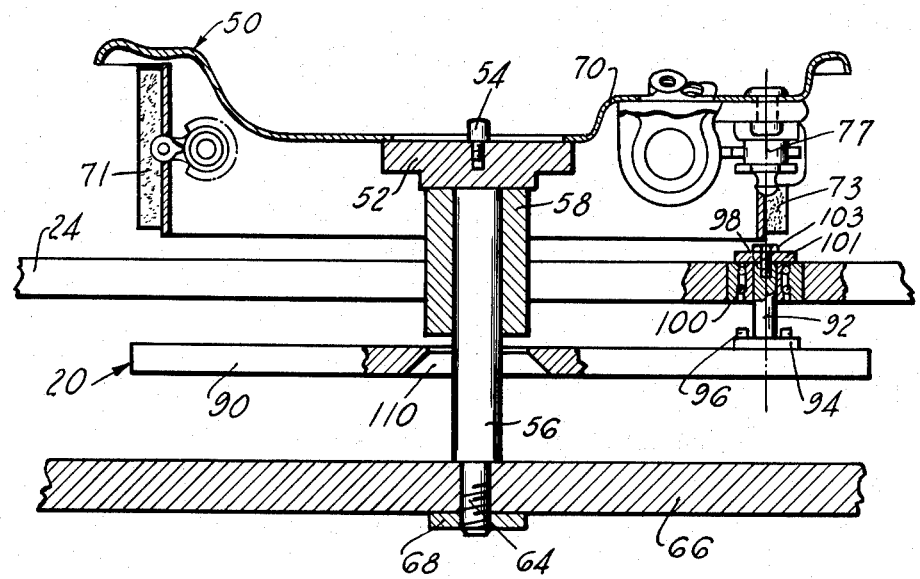
FIGURE 5 is a cross sectional view taken on line 5—5 of FIGURE 2.

A movable plate 90 is supported by a spindle 92 provided with a flanged end 94 which is fixedly secured to plate 90 by suitable fastening means such as bolts 96 and an opposite end 98 which is rotatably carried by support platform 20 via a roller bearing 100. A retaining member 101 secured to spindle 92 by a bolt 103 serves to hold the spindle 92 in position in bearing 100. The plate 90 is supported also by roller bearings 102 and 104 each of which is mounted for rotation on an associated support 106 fixedly secured to plate 66 by any suitable fastening means such as bolt and nut arrangements 108. The plate 90 is provided with an opening 110 of larger diameter than spindle portion 56 extending therethrough which permits the plate 90 to swing about the axis of spindle 92 through a limited range of movement at right angles to the spindle portion 56. Spaced apart support arms 112 and 114 extend through slots 28 and 30, respectively, and are adjustably secured to an associated plate 116 via slots 118 in support arms 112 and 114 and bolts 120 which extend through the slots 118 into threaded engagement with the plates 116. The plates 116 are adjustably secured to plate 90 via slots 122 in plate 116 through which bolts 124 extend into threaded engagement with plate 90. An anvil 126 fixedly secured to the support arms 112 by suitable fastening means such as bolts or the like, not shown, abuts the friction lining on one brake shoe of the brake assembly 50 positioned as shown in FIGURE 3. The friction lining on the opposite brake shoe of brake assembly 50 is engaged by anvil 128. The anvil 128 is secured by a bolt 130 to a plunger 132 slidably carried in a bore 134 in support arm 114. A reduced diameter extention 136 of plunger 132 extends through on opening 138 at one end of bore 134. A spring 140 interposed between plunger 132 and one end of bore 134 urges the plunger 132 and anvil 128 secured thereto toward opposing anvil 126. An adjustable stop 142 secured to extension 132 is adapted to engage support arm 114 thereby limiting the extent of movement of plunger 132 under the influence of spring 140. A bracket 144 fixedly secured to support arm 114 by any suitable fastening means such as bolts 146 serves to support a conventional dial indicator 148 fixedly secured thereto. The stem 150 of the dial indicator 148 is removably secured to the end of extension 136 by connecting members 152.

*Operation*

It will be understood that the fixture is calibrated initially through the use of a master brake assembly, not shown, having a predetermined diameter i.e., distance between diametrically opposed points on the friction lining carried by the two brake shoes. The master brake assembly is positioned on head portion 52 and motor means 78 energized by the operator through manipulation of control members 84 and 86 to effect downward movement of ram member 75 into engagement with the backing plate of the master brake assembly thereby clamping the brake assembly in position on head portion 52 between anvils 126 and 128 with anvil 126 bearing against the friction lining of its adjacent brake shoe and anvil 128 bearing against the friction lining of the opposite brake shoe. The dial indicator is set to its zero position and the adjustable stop 142 adjusted to permit a predetermined limited movement of anvil 128 under the influence of spring 140 when the master brake assembly is removed. The ram member 75 is raised and the master brake assembly removed from head portion 52 whereupon the fixture is ready for operation.

A production run brake assembly 50 is placed upon head portion 52 with locating pin 54 extending through a predetermined one of the openings 74 to thereby fix the position of the brake assembly 50 with the axis of the anchor member 154 about which the brake shoe assembly pivots in line with the spindle 92 axis about which the plate 90 pivots. Since the pivot axes of the brake shoe assembly and the plate 90 are collinear and the plate 90 is free to pivot about its axis, it will be noted that the anvils 126 and 128 carried by plate 90 and movable therewith are positioned by the friction lining surface of the associated brake shoe adjacent each of the anvils. As a result of the anvils 126 and 128 being positioned by the brake shoes rather than the brake shoe assembly being forcibly urged against a fixed locating point as would be the case if anvil 126 were fixed in position, it is apparent that the brake shoes will not be distorted from their initial assembled or free position. Now, with the plate 90 and anvils 126 and 128 attached thereto free to adjust to the position of the brake shoes in the abovementioned manner, the anvil 128 will be urged against the friction surface of its adjacent brake shoe by the force of spring 140 which, in turn, draws the opposite anvil 126 against the friction surface of its adjacent brake shoe by virtue of the pivot action of the plate 90.

The dial indicator 148 will respond to the position of anvil 128 thereby indicating any relative error from the desired brake setting as established by the aforementioned master brake assembly. If an error is indicated, the operator rotates the handwheel 40 in one direction or the other depending upon the relative error in diameter of the brake assembly. Rotation of handwheel 40 rotates the gear train 44 which has an output gear 156 which meshes with the star wheel of an adjustable strut 158 connecting adjacent ends of the brake shoes thereby increasing or decreasing the effective diameter of the brake assembly 50 as desired to establish the desired zero reading of the dial indicator 148.

The operator having established the desired brake setting then trips control members 80 and 82 and to raise the ram member 75 thereby releasing the brake assembly 50 which is subsequently removed from head portion 52 and replaced by the next brake assembly to be processed.

It will be understood by those persons skilled in the appropriate art that various modifications of the structure shown and described may be made without departing from the scope of applicant's invention.

I claim:

1. A brake adjusting fixture for use with a self-centering brake assembly having a plurality of relatively movable brake shoes pivotally engaged with an anchor member fixedly secured to a backing plate and adapted to pivot as a unit and a brake adjusting member for varying the relative positions of the brake shoes, said fixture comprising:

support means including a member engageable with the backing plate for holding the brake assembly in a fixed position, a support member mounted to pivot about an axis collinear with the axis of the anchor member about which the brake shoes pivot, spaced apart first and second brake shoe engaging means secured to said support member and movable therewith for measuring the effective diameter of the brake assembly as determined by diametrically opposite first and second friction portions of the relatively movable brake shoes, one of said first and second brake shoe engaging means being slidably carried by said support member, position indicating means operatively connected to said one brake shoe engaging means and movable therewith for indicating the relative position thereof, resilient means carried by said support member and operatively connected to said one brake shoe engaging means for imposing a load on said support member which urges said first and second brake shoe engaging means into contact with the respective brake shoes adjacent thereto, and means operatively connected to the brake adjuster for actuating the same to establish a predetermined effective diameter in accordance with said position indicating means.

2. A brake adjusting fixture for use with a self-centering brake assembly having a pair of brake shoes pivotally secured at first adjacent ends to an anchor member secured to a backing plate and an adjustable strut connected between second adjacent ends of the brake shoes for adjusting the relative positions thereof, said fixture comprising:

fixed support means, a first support member secured to said fixed support means and engageable with the backing plate of the brake assembly for holding the same in a fixed position, a movable member engageable with the backing plate for securing the same in position on said first support member, a second support member pivotally secured to said fixed support means and arranged to pivot on an axis collinear with the axis of the anchor about which the brake shoes pivot, a first brake shoe engaging member fixedly secured to said second support member and movable therewith, a second brake shoe engaging member slidably mounted on said second support member and movable therewith, resilient means operatively connected to said second brake shoe engaging member and said second support member for imposing a load thereon which tends to urge the same apart, said first and second brake shoe engaging members being arranged to engage the brake shoes at diametrically opposite locations thereon, position indicating means operatively connected to said second brake shoe engaging member and movable therewith for indicating the relative position thereof, and means carried by said fixed support means and operatively connected to the adjustable strut for adjusting the strut to establish a predetermined brake shoe setting in accordance with said position indicating means.

3. A brake adjusting fixture as claimed in claim 2 wherein said fixed support means includes spaced apart fixed upper and lower plate members, spaced apart bearing means secured to said lower plate member and adapted to support said second support member, first and second oppositely disposed slots formed in said upper plate member, first and second vertically extending arms secured at the lower ends thereof to said second support member and extending through said first and second slots, respectively, said first and second brake shoe engaging members being connected to the upper ends of said first and second arms, respectively.

4. A brake adjusting fixture for use with a self-centering brake assembly having a pair of relatively movable brake shoes pivotally secured at first adjacent ends to an anchor member secured to a backing plate and an adjustable strut connected between second adjacent ends of the brake shoes for adjusting the relative positions thereof, said fixture comprising:

fixed support means including a member engageable with the backing plate for supporting the brake assembly in a fixed position, movable support means mounted on said fixed support means for pivotal movement about an axis collinear with the axis of the anchor member about which the brake shoes pivot, first and second spaced apart means secured to and movable with said movable support means and arranged to engage the pair of brake shoes at diametrically opposite locations on the friction surfaces thereof, one of said first and second spaced apart means being provided with a sliding connection with said movable support means and movable toward and away from the opposite of said first and second spaced apart means, indicating means operatively connected to said one of said first and second spaced apart means for indicating the relative position thereof with said first and second spaced apart means in engagement with respective adjacent brake shoes, and resilient means operatively connected to said one of said first and second spaced apart means and said movable support means for imposing a load thereon which tends to urge said one of said first and second spaced apart means into engagement with its adjacent brake shoe and said movable support means about its axis thereby urging the other of said first and second spaced apart means into engagement with its adjacent brake shoe.

5. A brake adjusting fixture for use with a self-centering brake assembly having a pair of brake shoes pivotally mounted at first adjacent ends to an anchor member secured to a backing plate and an adjustable strut connecting second adjacent ends of the brake shoes for adjusting the the relative positions thereof, said fixture comprising:

support means including a member engageable with the backing plate for holding the brake assembly in a fixed position, a support member mounted to pivot about an axis collinear with the axis of the anchor member about which the brake shoe pivot, spaced apart first and second brake shoe engaging means secured to said support member and movable therewith and engageable with the brake shoes for measuring the effective diameter of the brake assembly as determined by diametrically opposite first and second portions of the pair of brake shoes, one of said first and second brake shoe engaging means being slidably carried by said support member for movement toward and away from the other of said brake shoe engaging means, position indicating means operatively connected to said one brake shoe engaging means and movable therewith for indicating the relative position thereof, resilient means operatively connected to said support member and said one brake shoe engaging means for urging said one brake shoe engaging means into engagement with said first portion of the relatively movable brake shoes and urging said support member about its pivot axis to thereby urge the other of said brake shoe engaging means into engagement with said second portion of the relatively movable brake shoes, and means operatively connected to the adjustable strut for actuating the same to establish a predetermined effective diameter in accordance with said position indicating means.

6. A brake adjusting fixture as claimed in claim 5 and further including stop means operatively connected to said one brake shoe engaging means for limiting the movement thereof in response to said resilient means.

No references cited.

ISAAC LISANN, *Primary Examiner.*